US012717131B2

(12) United States Patent
Han

(10) Patent No.: US 12,717,131 B2
(45) Date of Patent: Aug. 25, 2026

(54) DISPLAY APPARATUS

(71) Applicant: LG DISPLAY CO., LTD., Seoul (KR)

(72) Inventor: Sungkyu Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 262 days.

(21) Appl. No.: 18/369,482

(22) Filed: Sep. 18, 2023

(65) Prior Publication Data

US 2024/0142773 A1 May 2, 2024

(30) Foreign Application Priority Data

Oct. 27, 2022 (KR) ........................ 10-2022-0139782

(51) Int. Cl.
*G02B 27/00* (2006.01)
*B60K 35/22* (2024.01)

(52) U.S. Cl.
CPC .......... *G02B 27/0018* (2013.01); *B60K 35/22* (2024.01); *B60K 2360/25* (2024.01); *G02B 2207/123* (2013.01)

(58) Field of Classification Search
CPC G02B 27/00; G02B 27/0018; G02B 27/0101; G02B 2207/123; G02B 5/0294; G02B 5/0257; G02F 1/01; G02F 1/00; G02F 1/0009; G02F 1/1323; G02F 1/133524; G02F 1/133345; G02F 1/13439; G02F 1/13454; G02F 1/134363; B60K 35/22; B60K 2360/25; G09F 9/30; G09F 9/335; G09F 9/35; H10H 20/8506; H10H 20/855; H10H 29/142; H10H 29/14; H10K 59/12; H10K 59/872; H10K 59/875; H10K 59/879; H10K 59/80; H10K 59/8791; H10K 59/40; H10K 50/858; H10K 50/84; H10K 50/865; H10K 50/86
USPC ........ 359/613, 609, 891, 242, 275, 277, 267
See application file for complete search history.

(56) References Cited

U.S. PATENT DOCUMENTS

| | | | | |
|---|---|---|---|---|
| 6,822,792 | B2 * | 11/2004 | Goto | G03B 21/625 359/628 |
| 2002/0167725 | A1 | 11/2002 | Goto | |
| 2011/0080538 | A1 | 4/2011 | Shiota et al. | |
| 2012/0268826 | A1 * | 10/2012 | Umeda | B29D 11/00326 156/247 |
| 2017/0108628 | A1 | 4/2017 | Larsen et al. | |
| 2018/0120580 | A1 | 5/2018 | Ouderkirk et al. | |
| 2020/0049864 | A1 * | 2/2020 | Huang | G02B 5/003 |
| 2020/0168838 | A1 * | 5/2020 | Hong | H10K 71/00 |

(Continued)

FOREIGN PATENT DOCUMENTS

| | | | |
|---|---|---|---|
| CN | 101499396 | A | 8/2009 |
| CN | 102033434 | A | 4/2011 |

(Continued)

*Primary Examiner* — Jie Lei
(74) *Attorney, Agent, or Firm* — Morgan, Lewis & Bockius LLP

(57) ABSTRACT

A display apparatus according to an embodiment of this specification includes a display panel including a display area and a non-display area. It includes a light control film on the display panel and a cover member on the light control film. The light control film of the display apparatus according to an embodiment of this specification includes a plurality of louver layers and a reinforcing layer on the plurality of louver layers for improving appearance quality, reliability, and viewing angle luminance.

20 Claims, 11 Drawing Sheets

(56) References Cited

U.S. PATENT DOCUMENTS

| | | | |
|---|---|---|---|
| 2021/0036263 | A1 | 2/2021 | Kim et al. |
| 2021/0271096 | A1 | 9/2021 | Kim et al. |
| 2022/0028940 | A1 | 1/2022 | Kim et al. |
| 2022/0043309 | A1 | 2/2022 | Johnson et al. |
| 2024/0248341 | A1 | 7/2024 | Xu |

FOREIGN PATENT DOCUMENTS

| | | | |
|---|---|---|---|
| CN | 106662743 | A | 5/2017 |
| CN | 108010980 | A | 5/2018 |
| CN | 111239870 | A | 6/2020 |
| CN | 112310173 | A | 2/2021 |
| CN | 112534332 | A | 3/2021 |
| CN | 113196115 | A | 7/2021 |
| CN | 113281925 | A | 8/2021 |
| CN | 113972240 | A | 1/2022 |
| EP | 4043941 | A | 8/2022 |
| JP | 2006-184609 | A | 7/2006 |
| JP | 2012-98751 | A | 5/2012 |
| JP | 2021-135346 | A | 9/2021 |
| KR | 10-2020-0061667 | A | 6/2020 |
| KR | 10-2021-0016233 | A | 2/2021 |
| KR | 10-2021-0043155 | A | 4/2021 |
| KR | 10-2021-0133482 | A | 11/2021 |

* cited by examiner

DISPLAY APPARATUS

CROSS REFERENCE TO RELATED APPLICATION

The present application claims priority to Korean Patent Application No. 10-2022-0139782 filed on Oct. 27, 2022, the entire contents of which is incorporated herein for all purposes by this reference.

BACKGROUND

Technical Field

This specification relates to a display apparatus, and more specifically, to a display apparatus including a light control film.

DISCUSSION OF THE RELATED ART

Display apparatuses, such as organic light emitting display (OLED) apparatuses, which self-emits the light, and liquid crystal display (LCD) apparatuses requiring a separate light source, are used in various electronic devices such as computers, monitors, televisions, mobile devices, home appliances, and vehicles.

These types of display apparatuses are used for displaying image data on various products such as computers, mobile phones, ATM machines, and vehicle navigation systems, tailored to the unique characteristics of each device.

A display apparatus is used to display desired video information for the user.

To apply display apparatuses in their respective fields, it is necessary to design and manufacture the display apparatus itself by adjusting the viewing angle appropriately. In response to these demands, an optical control film has been developed that can be attached to the display surface of a display apparatus to adjust the viewing angle.

SUMMARY

Accordingly, embodiments of the present disclosure are directed to a display apparatus that substantially obviates one or more of the problems due to limitations and disadvantages of the related art.

An aspect of the present disclosure is to provide a display apparatus capable of improving viewing angle luminance while satisfying the appearance quality with anti-stain characteristics.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, the display apparatus comprises a display panel including a display area and a non-display area. The display panel includes a light control film and a cover member disposed on the light control film. The light control film includes a plurality of louver layers and a reinforcement layer on the plurality of louver layers. Other specific details of embodiments are included in the detailed descriptions and drawings.

An embodiment of this specification can provide a display apparatus free from the external defect of diagonal stain, by including a reinforcement layer, which fills the concave portions of the louver layer of the light control film applied to the display apparatus, to prevent or reduce the occurrence of voids and bubbles.

An embodiment of this specification can provide a display apparatus with an advantage of preventing or reducing deformation during the module process, by including a reinforcement layer, which fills the concave portions of the louver layer of the light control film applied to the display apparatus, to prevent or reduce the occurrence of voids and bubbles.

An embodiment of this specification can provide a display apparatus with an advantage of in terms of improving the reliability of the display, by including a reinforcement layer, which fills the concave portions of the louver layer of the light control film applied to the display apparatus, to prevent or reduce the occurrence of voids and bubbles.

An embodiment of this specification can provide a display apparatus with an advantage of improving viewing angle luminance, by including a high refractive index reinforcement layer on top of the louver layer of the light control film applied to the display apparatus.

The effects of this specification are not limited to the aforesaid, and other effects not described herein with be clearly understood by those skilled in the art from the descriptions below.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
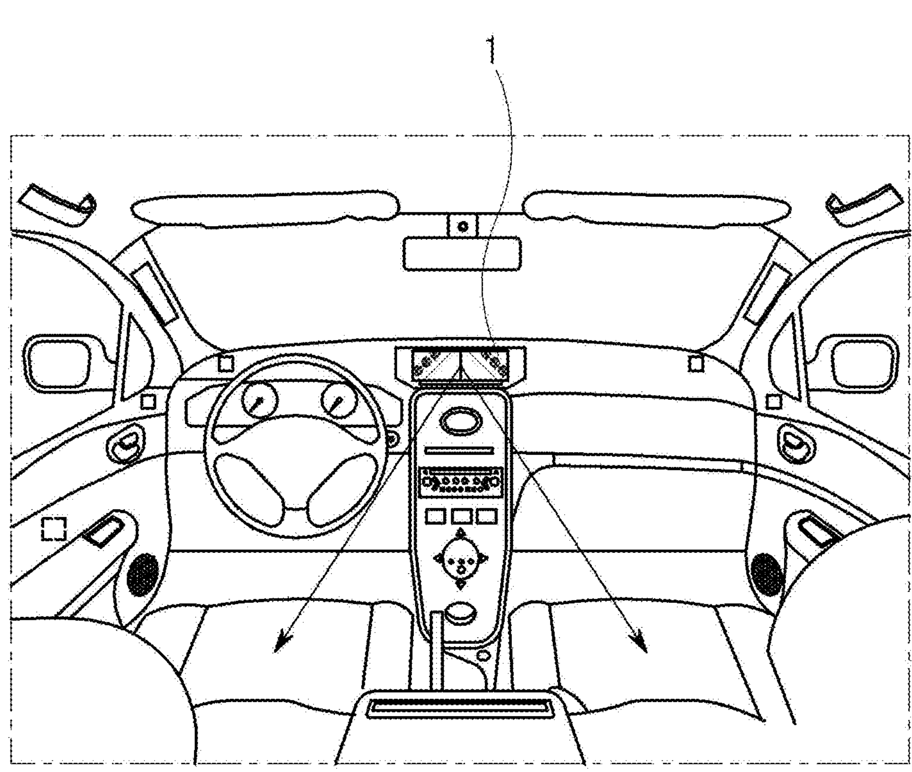
FIG. 1 is a diagram illustrating a display apparatus according to an embodiment of this specification.

Advantages and features disclosed in this specification and methods of accomplishing the same may be understood more readily by reference to the detailed description of embodiments that will be made hereinafter with reference to the accompanying drawings. However, this specification may be embodied in many different forms and should not be construed as being limited to the exemplary embodiments set forth herein; rather, these exemplary embodiments are provided so that this disclosure will be thorough and complete and will fully convey the concept of the invention to those skilled in the art, and the specification will only be defined by the appended claims.

The shapes, sizes, ratios, angles, numbers and the like illustrated in the drawings to describe embodiments of the specification are merely exemplary, and thus, the specification is not limited thereto. Throughout the specification, the same or similar reference numerals refer to the same or similar components. In addition, detailed descriptions of well-known technologies may be omitted in the specification to avoid obscuring the subject matter of the specification. When terms such as "comprises," "has," or "is made up of" are used in this specification, it should be understood that unless "only" is specifically used, additional elements or steps can be included. Unless otherwise explicitly stated, when a component is expressed in the singular form, it is intended to encompass the plural form as well.

In interpreting the components, it is construed to include a margin of error even in the absence of explicit description.

When describing the positional relationship, for example, when the relationship between two parts is described as "on", "on top of", "underneath", "beside", etc., unless "directly" or "immediately" is used, one or more other parts may be located between the two parts.

In the case of describing a temporal relationship, when the temporal sequence is described with terms such as "after," "followed by," "next," "before," etc., it may include non-continuous cases unless "immediately" or "directly" is used.

Although the terms "first", "second", and the like are used to describe various components, these components are not limited by these terms. These terms are merely used for distinguishing one component from the other components. Therefore, the first component mentioned hereinafter may be the second component in the technical sense of this specification.

Terms such as "the first", "the second", "A", "B", "(a)", and "(b)" may be used to describe components in this specification. These terms are only used only to distinguish one component from another, and the nature, sequence, order, or quantity of the corresponding components are not limited by the term. When a component is described as "connected," "coupled," or "joined" to another component, it should be understood that the component can be directly connected or joined to the other component, or a third component may be "interposed" between the components that can be indirectly connected or joined, unless explicit stated otherwise.

When a component is described as "at least one" it should be understood that all possible combinations of one or more of the related components are encompassed. For example, "at least one of the first, second, and third components" could be understood to encompass not only the first, second, or third elements, but also all combinations of two or more components among the first, second, and third components.

In this specification, the team "display apparatus" is used in a narrow sense to refer to display apparatuses, such as a liquid crystal module (LCM), an organic light-emitting diode (OLED) module, and a quantum dot (QD) module, each including a display panel and a panel driving unit to operate the display panel. In addition, the term may also be used to refer to set electronic devices, set devices, or apparatuses that include LCMs, OLED modules, QD modules, and the like, such as equipment display apparatuses including complete or final products such as laptop computers, televisions, computer monitors, automotive displays or equipment displays provided in other forms for vehicles, as well as mobile electronic devices such as smartphones or electronic pads.

Accordingly, in this specification, the display apparatus may include not only the display apparatuses in the narrow sense themselves, such as LCMs, OLED modules, QD modules, but also set devices as application products or final consumer devices each including LCMs, OLED modules, QD modules, and the like.

In some cases, an LCM, an OLED module, or a QD module, composed of a display panel and a panel driving unit may be referred to as "display apparatus" in a narrow sense, while an electronic device as a complete product including an LCM, an OLED module, or a QD module may be referred to as "set device". For example, the narrow-sense display apparatus may include a display panel of liquid crystal (LCD), organic light-emitting diode (OLED), or quantum dot (QD) and a source printed circuit board (PCB) as a control unit for driving the display panel, while a set device may further include a set PCB, serving as a set control unit that is electrically connected to the source PCB and controls the entire set device.

The display panel used in the embodiments of this specification may include all types of display panels such as liquid crystal display panels, organic light-emitting diode (OLED) display panels, quantum dot (QD) display panels, and electroluminescent display panels. The display panel used in the embodiments of this specification is not limited to a specific display panel capable of bending a bezel with a flexible substrate for OLED display panel and a backplate support structure thereunder. In addition, the display panel used in the embodiments of this specification is not limited to the shape or size of the display panel.

For example, when the display panel is an organic light-emitting diode (OLED) display panel, it may include a plurality of gate lines and data lines and pixels formed at the intersection of the gate lines and data lines. In addition, it may be configured to include an array including thin-film transistors as components for selectively applying voltage to each pixel, an organic light-emitting diode layer on the array, an encapsulation substrate or encapsulation layer arranged on the array to cover the organic light-emitting diode layer. The encapsulation layer may protect the thin film transistors and the organic light-emitting device layer from the external impacts and prevent or reduce moisture or oxygen from penetrating into the organic light-emitting device layer. In addition, the layers formed on the array may include an inorganic light-emitting layer, e.g., a nano-sized material layer or quantum dots.

The various features of the embodiments of the present invention can combined or assembled together, either partially or entirely, in a technically diverse manner, and each embodiment can be independently implemented or in conjunction with related embodiments.

Hereinafter, descriptions are made of the embodiments of this specification in detail with reference to accompanying drawings. Although depicted in a scale different from their actual scale for the convenience of explanation, the components are not limited to the scale shown in the drawing.

FIG. 1 is a diagram illustrating a display apparatus according to an embodiment of this specification, and the interior of a vehicle equipped with a display apparatus according to an embodiment of this specification is shown in FIG. 1.

The display apparatus 1 may be disposed in a part of the dashboard of the vehicle. The dashboard of a vehicle is disposed at the front of the front seats of the vehicle (e.g., the driver's seat and front passenger seat). For example, the dashboard of a vehicle may have input configurations for controlling various functions inside the vehicle (e.g., air conditioning, audio system, navigation system). For example, the display apparatus 1 may be placed in the center of the dashboard as shown in FIG. 1 to display navigation information, the front of the driver's seat, although not shown in FIG. 1, to display a cluster that shows the vehicle's speed, and the front of the front passenger seat, although not shown in FIG. 1, to display multimedia content. In an embodiment, the display apparatus 1 placed on the dashboard of the vehicle may serve as an input unit for manipulating at least some of the vehicle's various functions. The display apparatus 1 may provide various information related to the vehicle, such as driving information of the vehicle (e.g., current speed, remaining fuel amount, driving distance), and information about the vehicle's parts (e.g., damage to the vehicle's tires).

In an embodiment, the display apparatus 1 may be arranged to span across the driver's seat and front passenger seat of the vehicle. The display apparatus 1 may be used by both the driver and the passenger in the front passenger seat. Both the driver and the passengers of the vehicle may use the display apparatus 1.

In an embodiment, what is shown in FIG. 1 may be a part of the display apparatus 1. The display apparatus 1 shown in FIG. 1 may represent a display panel among various components constituting the display apparatus 1. Other components of the display apparatus 1, except for what is shown in FIG. 1, may be installed inside the vehicle (or at least some of them). FIG. 1 is an embodiment of the present specification and does not limit the scope of the specification.

FIG. 1 shows an exemplary vehicle interior with an improved ghosting effect on the front windshield when a light control film is applied, according to an embodiment of this specification.

As indicated by the arrows in FIG. 1, it is necessary to optimize the luminance characteristics on both the driver's and front passenger's sides. Since the navigation screen is typically viewed from both the driver's and front passenger's sides inside the actual vehicle, it is necessary to optimize the luminance characteristics in the left and right viewing angles rather than increasing the luminance in the center of the screen.

Figure 2:
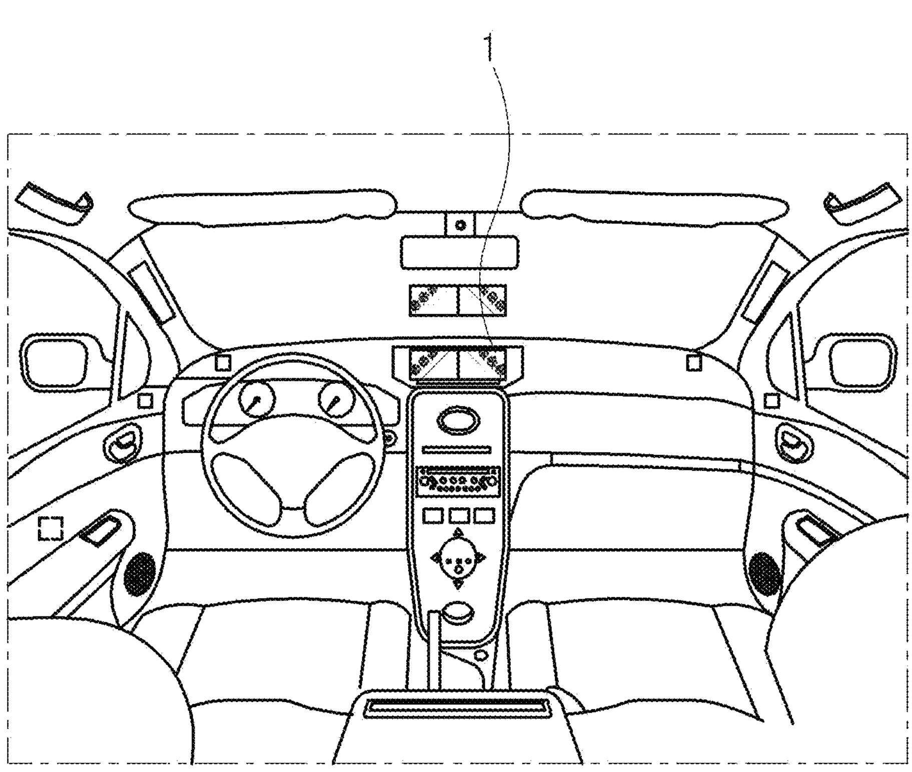
FIG. 2 is a diagram illustrating a display apparatus according to a comparative example of this specification.

FIG. 2 is a diagram illustrating a display apparatus according to a comparative example of this specification. FIG. 2 shows the ghosting effect on the front windshield when a light control film is not applied as a comparative example. With reference to FIGS. 1 and 2, when a light control film according to an embodiment of this specification is applied, the light emission direction is shifted down frontward and downward of the screen, preventing or reducing the navigation screen from reflecting on the front windshield of the vehicle. According to an embodiment of this specification, the light emission direction may be shifted left and right depending on the viewing angle pattern of the light control film to ensure optimal luminance conditions for both the driver and front passenger.

Figure 3:
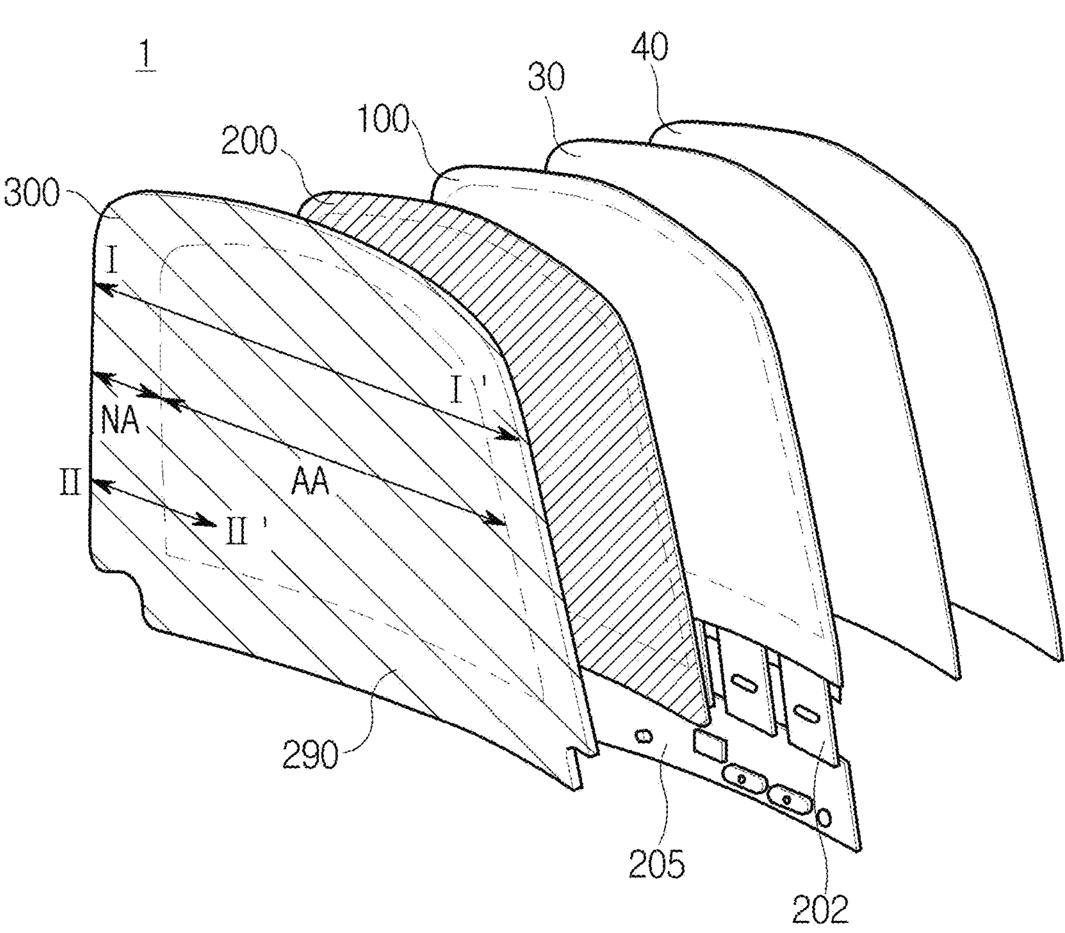
FIG. 3 is an exploded perspective view illustrating a display apparatus according to an embodiment of this specification.

FIG. 3 is an exploded perspective view illustrating the display apparatus 1 according to an embodiment of this specification. With reference to FIG. 3, the display apparatus 1 according to an embodiment of this specification may include a display panel 100 and a cover member 300 having a display area AA and a non-display area NA, and a support member 30 located on the rear bottom surface of the display panel 100. The support member 30 may support the display panel 100 on the rear surface thereof. The display apparatus 1 may include a plate 40 that may reinforce the rigidity of the display panel 100. The planar size of the plate 40 may be the same as the planar size of the display panel 100, but is not necessarily limited thereto.

For example, the plate 40 may be made of one of aluminum (Al), aluminum alloy, silver (Ag), and a silver alloy. The embodiments of this specification are not limited thereto.

In the display apparatus 1 of this specification, the light control film 200 and the cover member 300 may be disposed on the front surface of the display panel 100 where an image is displayed.

The cover member 300 corresponds to the display surface facing the viewer and is configured to directly receive touch inputs from the viewer. In FIG. 3, the inner area delimited by the dotted line is the display area AA where the images are displayed, and the outer perimeter (surroundings) of the display area AA is the non-display area NA. The display area AA and the non-display area NA are also defined in corresponding areas on the display panel 100. The cover member 300 is located on the display surface on which the viewer perceives the image and may include a cover window or cover glass, so that it transmits the image like a transparent film or glass. Since the cover member 300 includes the display area AA where the screen is displayed, it may be made of a transparent material such as a cover glass to allow the display of the screen. For example, the cover member 300 may be made of transparent plastic material, glass material, or tempered glass material, and the embodiments of the present specification are not limited thereto.

The cover member 300 allows light emitted from the display panel 100 to pass through to the outside and is attached to protect the surface of the display panel 100. A shielding layer 290 may be disposed on the rear surface of the non-display area NA of the cover member 300. The display area AA of the display apparatus 1 may distinguished as a light-transmissive portion that transmit light emitted from the display panel 100, and the non-display area NA may be distinguished as a light-shielding portion that does not transmit the light. The shielding layer 290 disposed on the non-display area NA may make it possible to prevent or reduce the underlying structure from being visible. The cover member 300 may be composed of a material with a high Young's modulus, such as a high-hardness material, to reduce cracks due to external impacts. Although glass is a representative material with high hardness, typical glass substrates (base material) have a thickness of 0.5 mm or more and are prone to cracking when folded or bent. Therefore, when the display apparatus 1 is required to have flexibility, such as in a flexible, bendable, or rollable display apparatus, the material of the cover member 300 may be made of glass with a thin thickness of 0.1 mm or less or a high-hardness material of a transparent plastic substrate with a certain level of light transmittance or higher.

In this case, the cover member 300, on which images are projected, is disposed as the top surface on the side facing the viewer. The cover member 300 may be arranged at the top of the display apparatus 1 and be formed to have the non-display area NA with larger in area than the light control film 200, display panel 100, support member 30, and plate 40, in order to prevent or reduce the relatively inner structures from being visible from the outside.

The light control film 200 may include a wide-angle adjusting structure to control the viewing range of images displayed on the display panel 100. The wide-angle adjusting structure may be provided within the light control film 200 in a pattern of trapezoidal shape with an angle adjusted to the desired viewing range. The wide-angle adjusting structure may be a louver layer. The wide-angle adjusting structure may be formed of a light-shielding material. The embodiments of this specification are not limited thereto. In addition, such a functional film may include a polarizer or the like that controls display characteristics (e.g., external light reflection, color accuracy, brightness, etc.). In some cases, the light control film 200 may not be implemented as a separate component, but instead may be patterned and incorporated on the top surface of the display panel 100 or on the inner surface of the cover member 300. The embodiments of this specification are not limited thereto.

The display panel 100 includes at least one display area (AA, also referred as an active area), which includes pixels, as the basic unit of display, arranged in an array. One or more non-display areas NA may be arranged around the display area AA. For example, the non-display area NA may be adjacent to one or more sides of the display area AA. The display area AA and the non-display area NA may be designed to fit the electronic device on which the display apparatus 1 is mounted.

The display panel 100 may, for example, be applied to a flexible display apparatus with a curvature, and the entire configuration may be used in a flexible form by encapsulating the internal array. The embodiments of this specification are not limited thereto.

For example, the display apparatus 1 according to embodiments of this specification may be applied to a portion of the front windshield of a vehicle viewed from the driver's or front passenger's seat, or to the entire front windshield of the vehicle. In this case, the edge portions of each component of the display apparatus 1 may be rounded to match the curved edges of the front windshield of a vehicle, instead of being straight. Furthermore, in the final installed form of the display apparatus 1, the display panel 100, or other components may be maintained in a curved state, following the surface of the front windshield of a vehicle, rather than completely flat. The embodiments of this specification are not limited thereto.

In the display apparatus 1 according to an embodiment of this specification, the rounding of these edge portions and the curved state of the surface may be applied not only to the display panel 100 but also to all the cover member 300, the optical control film 200, and the support member 30 that are in the form of a film, substrate, or laminate with a predetermined thickness. The embodiments of this specification are not limited thereto.

Each pixel within the display area AA may be associated with a pixel circuit. The pixel circuit may include one or more switching transistors and one or more driving transistors on the display panel 100. Each pixel circuit may be electrically connected to gate lines and data lines to communicate with one or more driving circuits, such as gate drivers and data drivers, located in the non-display area. The drive circuit may be implemented with a thin film transistor (TFT) in the non-display area NA. Such driving circuits may be referred to as gate-in-panel (GIP). In addition, some components such as a data driver integrated circuit (IC) may be mounted on a separate printed circuit board 205 and combined with a connection interface (pads/bumps, pins, etc.) located in the non-display area (NA) using a signal transmission film 202 such as a flexible printed circuit board (FPCB), a chip-on-film (COF), a tape-carrier-package (TCP), and the like. The display panel 100 may also include various additional components for generating various signals or driving pixels in the display area. The additional components may include an inverter circuit, a multiplexer, and an electrostatic discharge circuit. The lower or upper portion of the non-display area NA of the display panel 100 may be more protruded due to the accommodation of the connection interface arranged in the non-display area of the display panel 100. The printed circuit board 205 with the signal transmission film 202 may be folded toward the rear surface of the plate 40 to be prevented or reduced from being visible through the cover member 300.

A functional member (not shown) may be placed between the light control film 200 and the display panel 100. The functional member may be provided to enhance the mechanical, structural, and optical characteristics required for the display panel 100. The functional member may include additional components related to functions other than pixel driving. For example, the functional member may include additional components providing a touch detection function, a user authentication function (e.g., fingerprint recognition), a multi-level pressure sensing function, and a tactile feedback function. The functional member may be attached to the top surface of the display panel 100 by an adhesive. In addition, the functional member may also include a polarizer that controls display characteristics (e.g., external light reflection, color accuracy, brightness, etc.). The functional member may be attached to the top surface of the display panel 100 by adhesive.

With reference to FIG. 3, the plate 40 may be arranged to support and protect the rear surface of the display panel while providing a heat dissipation effect. The plate 40 may be a heat dissipation member. The plate 40 may include a heat-dissipating metal such as aluminum or an aluminum alloy. The embodiments of this specification are not limited thereto. This configuration allows the plate 40 to support a display panel 100 that may have a high degree of curvature, while absorbing heat generated by the operation of the display apparatus from below to prevent or reduce an increase in temperature of the display panel 100.

The display apparatus 1 according to an embodiment of this specification may include a support member 30 arranged between the display panel 100 and the plate 40 to assist in supporting the display panel. The embodiments of this specification are not limited thereto.

The support member 30 may be attached to the opposite surface (second surface) of the base substrate of the display panel 100, which has a light-emitting component on one side (firstsurface) thereof. The support member 30 may be made of a thin film composed of any combination of polyethylene naphthalate (PEN), polyethylene terephthalate (PET), polyethylene ether phthalate, polycarbonate, polyarylate, polyether imide, polyether sulfonate, polyimide, polyacrylate, or other suitable polymers, and the embodiments of this specification are not limited thereto. Other materials available to form the support member 30 include flat glass, metal foil shielded with dielectric, multilayer polymers, and polymer films containing polymer material combined with nano-particle or micro-particles, and the embodiments of this specification are not limited thereto. The support member may be thicker than the base substrate of the display panel 100 in order to provide support.

In the case of including the support member 30, a fastening process with the plate 40 may be performed after attaching the support member 30 to the rear surface of the display panel 100.

The plate 40 serves as a housing forming the outermost rear of the display apparatus 1 and may be made of various materials such as plastic, metal, aluminum, or glass.

In this case, the plate 40 may function as a case forming the outermost part of the display apparatus 1, but the embodiments of this specification are not limited thereto.

Figure 4:
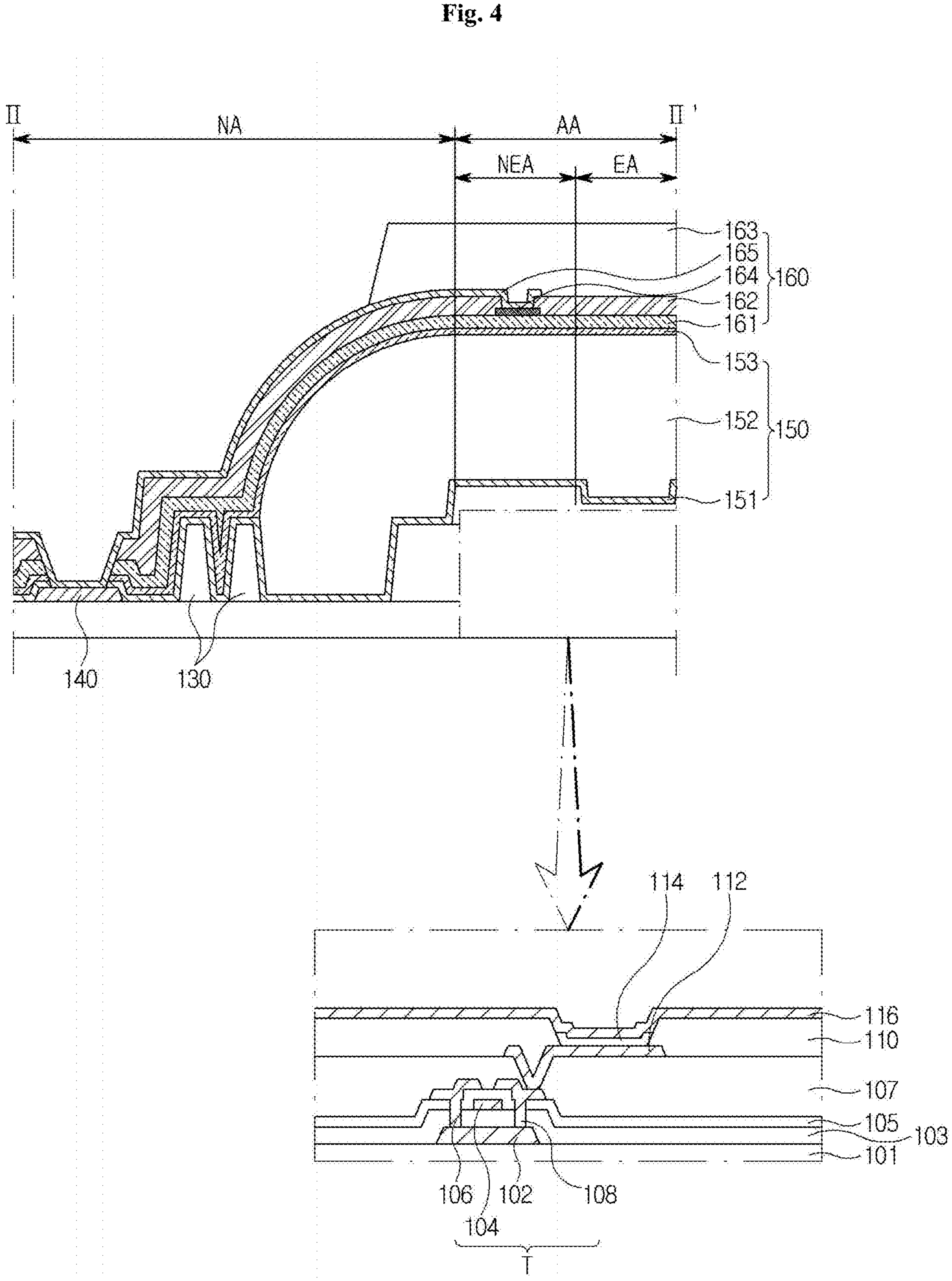
FIG. 4 is a cross-sectional view illustrating a part of a display panel of a display apparatus according to an embodiments of this specification.

FIG. 4 is a cross-sectional view illustrating a part of the display panel 100 of the display apparatus 1 according to an embodiment of the present specification. FIG. 4 is a cross-sectional view taken along the line II-II' of FIG. 3.

With reference to FIG. 4, the display panel 100 according to an embodiment of the present invention includes a substrate 101, a transistor T, a planarization layer 107, a light-emitting layer 114, a bank 110, a pad portion 140, a dam 130, an encapsulation portion 150, and a touch portion 160.

The transistor T is disposed on the substrate 101. The transistor T includes a gate electrode 104, an active layer 102, a source electrode 106, and a drain electrode 108. The transistor transmits data voltage to a plurality of sub-pixels.

An active layer 102 may be disposed on the substrate 101. The active layer 102 may include oxide semiconductors, amorphous silicon, or poly-silicon.

The gate electrode 104 may be disposed on the top or bottom of the active layer 102 depending on the structure of the transistor. The gate electrode 104 may be composed of a conductive material such as copper (Cu), aluminum (Al), molybdenum (Mo), titanium (Ti), or any alloy thereof, but is not limited thereto.

A gate insulating layer 103 may be disposed between the active layer 102 and the gate electrode 104. The gate insulating layer 103 is a layer that insulates the gate electrode 104 and the active layer 102 and may be composed of an insulating material. For example, the gate insulating layer 103 may be composed of a single layer or multilayer of silicon oxide (SiOx) or silicon nitride (SiNx), but is not limited thereto.

The source electrode 106 and the drain electrode 108 may be disposed on the substrate 101 and electrically connected to the active layer 102, while being spaced apart from each other. The source electrode 106 and the drain electrode 108 may be composed of a conductive material such as copper (Cu), aluminum (Al), molybdenum (Mo), titanium (Ti), or any alloy thereof, but are not limited thereto.

Depending on the structure of the transistor T, an interlayer insulation layer 105 or the like may be further disposed between the gate electrode 104 and the source electrode 106 and the drain electrode 108 for insulation therebetween, and configuration is not limited thereto.

The planarization layer 107 is disposed on the transistor T. The planarization layer 107 flattens the upper surface of a portion of the substrate 101. For example, the planarization layer 107 may be disposed in the display area AA, excluding the entire or partial region of the non-display area NA.

The planarization layer 107 may be composed of a single layer or multilayer, and may be made of organic material. For example, the planarization layer 107 may be composed of acrylic-based organic material, but is not limited thereto. The planarization layer 107 includes contact holes for electrically connecting the transistor T and a light emitting component.

The light emitting component is disposed on the planarization layer 107. The light emitting component is a self-light emitting component that emits light and may be driven by a voltage supplied from a transistor or the like. The light emitting component includes an anode 112, a light-emitting layer 114, and a cathode 116.

The anode 112 is disposed on the planarization layer 107 per sub-pixel separately. The anode 112 is electrically connected to the transistor T through the contact hole formed in the planarization layer 107. The anode 112 is made of a conductive material that may supply positive charges to the light-emitting layer 114. For example, the anode 112 may be composed of a reflective layer made of a transparent conductive material such as tin oxide (TO), indium tin oxide (ITO), indium zinc oxide (IZO), indium zinc tin oxide (ITZO), and high reflectivity material such as silver (Ag) and silver alloys, and is not limited thereto.

The bank 110 is disposed on the anode 112 and the planarization layer 107. The bank 110 is an insulating layer delimiting adjacent sub-pixels. The bank 110 may be arranged to expose a portion of the anode 112 and may be made of an organic insulating material arranged to cover the edge of the anode 112.

The light-emitting layer 114 is disposed on the anode 112. The light-emitting layer 114 may be composed of a single emissive layer or a stacked structure of a plurality of emissive layers that emit light of different colors. The light-emitting component may also include a hole injection layer, a hole transport layer, an electron transport layer, and an electron injection layer. With reference to FIG. 4, the light-emitting layer 114 is shown as being arranged per sub-pixel, separating each sub-pixel, but is not limited thereto. For example, the entire or part of the light-emitting layer 114 may be formed as a single layer over a plurality of sub-pixels. The light-emitting layer 114 may also be an organic light-emitting layer, but is not limited thereto. For example, the light-emitting layer 114 may be a quantum dot light-emitting layer or a micro light emitting diode (LED).

The cathode 116 is arranged on the light-emitting layer 114. The cathode 116 is made of a conductive material capable of supplying electrons to the light-emitting layer 114. For example, the cathode 116 may be made of a transparent conductive oxide such as indium tin oxide (ITO), indium zinc oxide (IZO), indium tin zinc oxide (ITZO), zinc oxide (ZnO), and tin oxide (TO), or an ytterbium (Yb) alloy that can supply electrons to the light-emitting layer 114, and the embodiments of the present specification are not limited thereto. Alternatively, the cathode 116 may also be composed of a very thin layer of metal material, but is not limited thereto. With reference to FIG. 4, although the cathode 116 is shown as being disposed continuously across the sub-pixels, it may also be arranged discretely for each sub-pixel, similar to the anode 112, and is not limited thereto.

The display area AA may include a plurality of light-emitting areas EA and non-light-emitting areas NEA between the plurality of light-emitting areas (EA).

The area where the plurality light-emitting components are arranged may be a plurality of light-emitting areas EA. Each of the plurality of light-emitting areas EA may emit light of a single color independently, and be an area corresponding to a plurality of sub-pixels or an area where the bank 110 is not disposed. For example, the plurality of light-emitting areas EA may include areas emitting red, green, and blue light, but is not limited thereto. The plurality of light-emitting areas EA may be arranged apart from each other, and for example, may be arranged in a grid pattern arranged in the row and column directions, but is not limited thereto.

The area where the plurality of light-emitting components is not arranged may be a non-light-emitting area NEA. The non-light-emitting area NEA is an area located between the plurality of light-emitting areas EA, and may be an area where the bank 110 is disposed. Since the non-light-emitting area NEA is disposed surrounding the plurality of light-emitting areas EA, it may be formed in a mesh pattern.

The dam 130 is dispose in the non-display area NA. For example, the dam 130 may be disposed on the substrate 101 in the non-display area NA. The dam 130 is arranged to control the spreading of the organic encapsulation layer 152 among the encapsulation portion 150 disposed to cover the display area AA on the substrate 101. For example, the dam 130 may prevent or reduce the overflow of the organic encapsulation layer 152 of the encapsulation portion 150. The dam 130 may be composed of one or more units, and there is no limitation on the number of dams that can be arranged.

The pad portion 140 is arranged in the non-display area NA. The pad portion 140 may be disposed outside the dam 130. Through the pad portion 140, signals can be input to circuit parts, drive ICs, and the like formed on the substrate 101. For example, the pad portion 140 can supply signals from the outside to the circuit parts, drive ICs, and the like formed on the substrate 101. For example, the pad portion 140 may supply signals to the touch portion 160 to drive the touch portion 160, and receive signals corresponding to the user's touch input from the touch portion 160.

An encapsulation portion 150 is disposed on top of the light-emitting component. The encapsulation portion 150 is a sealing member that protects the light-emitting component from external moisture, oxygen, shock, etc. The encapsulation portion 150 may be arranged to cover the entire display area AA where the light-emitting component is located, and may also be arranged to cover a part of the non-display area NA extended from the display area (AA). The encapsulation portion 150 may include a first inorganic encapsulation layer 151 made of an inorganic material, an organic encapsulation layer 152 made of an organic material and disposed on the first inorganic encapsulation layer 151, and a second inorganic encapsulation layer 153 disposed on the organic encapsulation layer 152.

The first inorganic encapsulation layer 151 seals the display area AA to protect the light-emitting component from oxygen and moisture penetrating into the display area AA. The first inorganic encapsulation layer 151 may be arranged not only over the display area AA, but also over the non-display area NA extended from the display area AA to cover the dam 130 or other structures in the non-display area NA. The first inorganic encapsulation layer 151 may be made of an inorganic material such as, silicon nitride (SiNx), silicon oxide (SiOx), silicon oxynitride (SiON), and the like, but is not limited thereto.

The organic encapsulation layer 152 is disposed on the first inorganic encapsulation layer 151. The organic encapsulation layer 152 may serve as a layer to flatten the top surface of the first inorganic encapsulation layer 151, fill any cracks that may occur in the first inorganic encapsulation layer 151, and flatten, when foreign substances are formed on the first inorganic encapsulation layer 151, the top surface of the foreign substances. The organic encapsulation layer 152 may be arranged to cover the display area AA and a part of the non-display area NA extending from the display area AA within the inner side of the dam 130. The organic encapsulation layer 152 may use polymers such as the epoxy or acrylic series, but is not limited to these.

The second inorganic encapsulation layer 153 is disposed on the organic encapsulation layer 152. The second inorganic encapsulation layer 153 may seal the organic encapsulation layer 152 together with the first inorganic encapsulation layer 151 in a way that contacts the first inorganic encapsulation layer 151 at the periphery of the display panel 100. The second inorganic encapsulation layer 153 may be arranged to cover a portion of the non-display area NA extending from the display area AA and contact the first inorganic encapsulation layer 151 placed in the non-display area NA. The second inorganic encapsulation layer 153 is made of an inorganic material, such as silicon nitride (SiNx), and silicon oxide (SiOx), silicon oxynitride (SiON), but is not limited thereto.

Although it is depicted in FIG. 4 that the encapsulation portion 150 includes the first inorganic encapsulation layer 151, the organic encapsulation layer 152, and the second inorganic encapsulation layer 153, the inorganic encapsulation layers 151 and 153 and the organic encapsulation layer 152 constituting the encapsulation portion 150 is not limited in quantity.

The touch portion 160 is disposed on the encapsulation portion 150. The touch portion 160 is placed on the encapsulation portion 150 and may sense touch inputs in the display area AA including the light emitting component. The touch portion 160 may detect external touch information generated with the user's finger, touch pen, or the like. The touch portion 160 includes a first inorganic dielectric layer 161, a second inorganic dielectric layer 162, an organic dielectric layer 163, a first touch portion 164, and a second touch portion 165.

The first inorganic dielectric layer 161 is in contact with the second inorganic encapsulation layer 153 of the encapsulation portion 150. The first inorganic dielectric layer 161 may be made of inorganic material. For example, it may be made of inorganic material such as silicon nitride (SiNx), silicon oxide (SiOx), silicon oxynitride (SiON), but is not limited thereto.

The first touch portion 164 is disposed on the first inorganic dielectric layer 161. The first touch portion 164 is disposed on the first inorganic dielectric layer 161 in the non-light-emitting area NEA. The first touch portion 164 may each be arranged spaced apart from each other in the X-axis direction and the Y-axis direction. For example, the first touch portion 164 may include a plurality of patterns arranged, spaced apart from each other, in the X-axis and the Y-axis directions. The first touch portion 164 supplies a touch driving signal to drive the touch portion 160. In addition, the first touch portion 164 may transmit touch information detected on the touch portion 160 to the driving IC. The first touch portion 164 may be formed in a mesh shape, but is not limited thereto. The first touch portion 164 may be made of a metallic material, but is not limited thereto.

The second inorganic dielectric layer 162 is disposed on the first inorganic dielectric layer 161 and the first touch portion 164. The second inorganic dielectric layer 162 may prevent or reduce the short circuit of the first touch portions 164 arranged adjacently. The second inorganic dielectric layer 162 may be made of an inorganic material. For example, it may be made of inorganic materials such as silicon nitride (SiNx), silicon oxide (SiOx), silicon oxynitride (SiON), but is not limited thereto.

Figure 5:
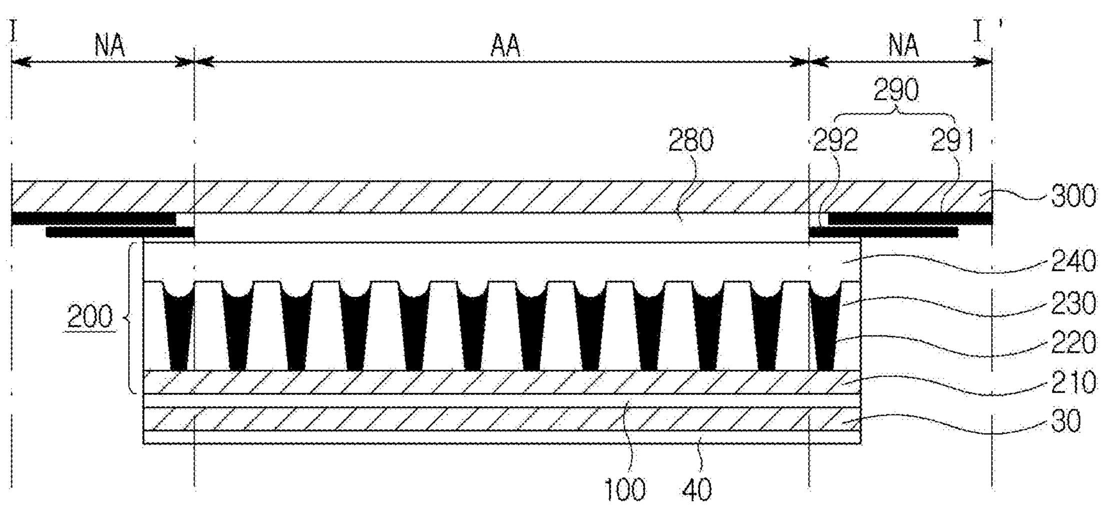
FIG. 5 is a cross-sectional view of a display apparatus according to an embodiment of this specification.

FIG. 5 is a cross-sectional view of a display apparatus according to an embodiment of this specification. FIG. 5 is a cross-sectional view taken along the line I-I' of FIG. 3. FIG. 5 shows a light control film according to an embodiment of this specification.

The cover member 300 may be positioned on the display panel 100 and/or the light control film 200 according to an embodiment of this specification. The cover member 300 may be positioned on the top surface of the display apparatus to protect the display panel 100 and/or the optical control film 200 from external impact.

The light control film 200 may be a film that has a function of controlling the incident light to be emitted within a predetermined angle range. The light control film 200 may include a louver layer 220 that is provided to control the viewing range of an image displayed on the display panel 100.

The light control film 200 may include a transparent material such as a base layer 210, a reinforcing layer 240, and a light-transmitting layer 230. For example, the reinforcing layer 240 and the light-transmitting layer 230 may include a transparent organic material.

A plurality of louver layers 220 may be disposed on the base layer 210.

The plurality of louver layers 220 may be spaced apart, and a transparent light-transmitting layer 230 may be disposed in the spacing region between the plurality of louver layers 220.

The light-transmitting layer 230 may include resin material. For example, the light-transmitting layer 230 may include a photopolymer resin material. For example, the light-transmitting layer 230 may include ultraviolet (UV) resin or a transparent photoresist resin. Alternatively, the light-transmitting layer 230 may include material such as urethane resin or acrylic resin. The light-transmitting layer 230 may be a polymer material (e.g., acrylic) with a transmittance of a predetermined percentage or more (e.g., 80 percent or more).

The light control film 200 may allow light emitted from the display panel 100 to be incident on the cover member 300. The light-transmitting layer 230 may transmit light, and the transmitted light may be directed toward the top of the cover member 300. However, the embodiments are not limited thereto, and depending on the user's position, the movement direction of the light may be reversed.

The louver layer 220 may have a property of absorbing light.

The louver layer 220 may include black color material.

The louver layer 220 may include a material capable of absorbing light. The louver layer 220 may be a polymer material (such as resin) that includes light-absorbing material (such as black pigments, dyes, etc.) capable of blocking (or absorbing) light. The louver layer 220 may have color. For example, the louver layer 220 may include black particles capable of absorbing light. For example, the louver layer 220 may include carbon black particles.

For example, the louver layer 220 may include opaque material such as metallic substances, nitrides, or carbon allotropes. For example, it may include one of silicon nitride (SiN), titanium nitride (TiN), silicon carbide (SiC), tantalum (Ta), titanium (Ti), tungsten (W), nickel (Ni), copper oxide (CuO), aluminum oxide ($Al2O3$), iron oxide ($Fe3O4$), nickel oxide (NiO), and tantalum oxide ($Ta2O5$), and the embodiments of this specification are not limited thereto. For example, the louver layer 220 may be formed of carbon allotropes such as graphene, carbon nanotubes, or fullerenes, and the embodiments of this specification are not limited thereto. In addition, a louver layer 220 may be formed using organic material with superior light absorption properties.

The louver layer 220 may include a plurality of patterns. The louver layer 220 may be formed with a plurality of engraved patterns. The louver layer 220 may include a plurality of louver layers that are spaced apart from each other. The plurality of louver layer 220 may be formed by extending in one direction. The light-transmitting layer 230 may be disposed in the gap area between louver layers. The light-transmitting layer may be disposed between a plurality of adjacent louver layers.

For example, the louver layer 220 may be adjusted to the viewing angle of the display to suit the usage environment.

Some display apparatuses may require a wide viewing angle to accommodate multiple viewers, while others may need to limit the viewing angle within a certain range. For example, in the case of a display apparatus for vehicles, it is necessary to adjust the viewing angle to prevent or reduce the images displayed on the screen from being reflected on the (front or side) windows. Adjusting the viewing angle (especially in the upward direction) of a display apparatus may vary in range and degree depending on the requirements of the manufacturer of the apparatus that employs the display apparatus.

For display apparatuses that require adjusting the viewing angle in a specific direction, such as a display apparatus for a vehicle, there may be attempts to meet the required conditions by additionally placing a light control film 200.

Referring to FIG. 5, the light control film 200 may be disposed with louver layers 220 extended in the vertical direction to adjust the viewing angle in the vertical direction.

The plurality of louver layers 220 may have a columnar shape of which the width varies in the direction from the bottom close to display panel 100 to the top close to the cover member 300.

For example, in order to adjust the viewing angle in the horizontal direction, the louver layer 220 may be elongated vertically. As shown in FIG. 5, the reinforcing layer 240 may be disposed on the upper side of the louver layer 220 and the light-transmitting layer 230.

For example, to narrow the viewing angle in the horizontal direction based on FIG. 5, the louver layer 220 may be formed higher in the vertical direction. On the contrary, to widen the viewing angle in the horizontal direction, the louver layer 220 will be formed lower in the vertical direction.

As depicted in the cross-sectional view, the light control film 200 may include the louver layer 220 that blocks light incident at an angle exceeding a certain angle towards the cover member 300. The louver layer 220 may be formed concavely due to surface tension during production. The louver layer 220 is disposed on the top surface of base layer 210 made of a transparent material. The light-transmitting layer 230 transmitting light incident at an angle less than a predetermined angle may be disposed between the plurality of louver layers 230.

Figure 6:
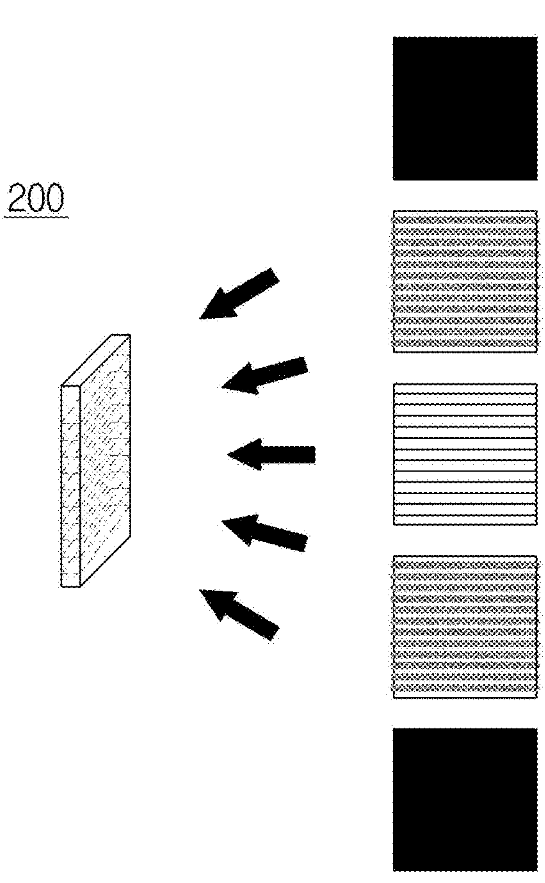
FIG. 6 is a diagram illustrating a light control film according to an embodiment of this specification.

Light traveling parallel or at an angle below a predetermined angle with respect to the height direction (vertical direction in FIG. 5) of the louver layer 220 passes through the light control film 200. However, light traveling at an angle above a predetermined angle with respect to the height direction of the louver layer 220 is blocked by the louver layer 220. Therefore, as the viewing angle increases in the vertical direction the amount of light emitted in the corresponding direction decreases as shown in FIG. 6. Therefore, from the viewer's side, the screen is not perceived beyond a certain viewing angle. For example, with a predetermined threshold (e.g., upper 45°), the image emitted from the display apparatus will not be visible at viewing angles greater than that.

The louver layer 220, which plays a main role in blocking light, may have a cylindrical shape with a circular, elliptical, or polygonal horizontal cross-section. The louver layer 220 may have a columnar shape with a cross-sectional area that increases in the direction from the display panel 100 direction to the cover member 300. In this case, the louver layer 220 may have a trapezoidal cross-section in the height direction (vertical direction). The oblique sides of the trapezoidal louver layer 220 have a slope to block and transmit light, and the oblique sides facing each other in the trapezoid may be designed to be asymmetrical, for example, to have different slopes, to implement different vertical (or horizontal) viewing angles.

The louver layer 220 has a height and arrangement pitch based on a predetermined angle for blocking or transmitting light. As the desired angle to be blocked becomes wider (or the desired viewing angle becomes narrower), the louver layer 220 may need to be taller or have a narrower arrangement pitch. For example, the louver layer 220 may have a width of about 20 to 30 micrometers (μm) that is not easily recognizable to the human eye. For example, to provide a viewing angle of about 30 degrees, the louver layer 220 may be arranged with a height of about 100 μm and a pitch of about 39 μm.

With reference to FIG. 5, the cover member 300 may include a shielding layer 290 that covers the periphery of the image display area.

The shielding layer 290 is arranged to correspond to the non-display area NA of the display panel 100, and may conceal various additional elements (such as circuits, wiring, etc.) located in the non-display area NA from being visible. The shielding layer 290 may be disposed on one surface in the direction of the display panel. The shielding layer 290 may also be called a black matrix.

The shielding layer 290 may be an opaque mask layer, such as one made of black ink (e.g., polymer filled with carbon black). The shielding layer 290 may consist of one or more layers. The shielding layer 290 may include a first shielding layer 291 and a second shielding layer 292. The shielding layer 290 and the louver layer 220 may be of substantially the same color of black.

The shielding layer 290 and louver layer 220 implemented above have almost no noticeable color difference. As an example, the color difference between the shielding layer 290 and the louver layer 220 may be 3 or less. Here, the color difference the difference between two colors defined based on ΔL*, Δa*, and Δb* as differences of coordinates L*a*b* in the L*a*b* color system, and it is represented by ΔE as shown in Equation 1.

$$\Delta E=(\Delta L^{*}2+\Delta a^{*}2+\Delta b^{*}2)^{1/2} \quad \text{Equation 1:}$$

where L* refers to the lightness, and a* and b* refers to the CIE color coordinates.

The cover member 300 may be adhered to the light control film 200 via a fixing member 280. The embodiments of this specification are not limited thereto.

The bonding member 280 may be formed as a transparent adhesive member, as it may be arranged to overlap with the display area AA. For example, the bonding member 280 may be formed of or include a material such as optical clear adhesive (OCA), optical clear resin (OCR), or pressure sensitive adhesive (PSA), but the embodiments of the present specification are not limited thereto.

A reinforcing layer 240 may be disposed on the concave upper portion of the louver layer 220 and the upper portion of the light-transmitting layer 230. The reinforcing layer 240 may fill the concave upper portions of the plurality of louver layers 220.

Figure 7:
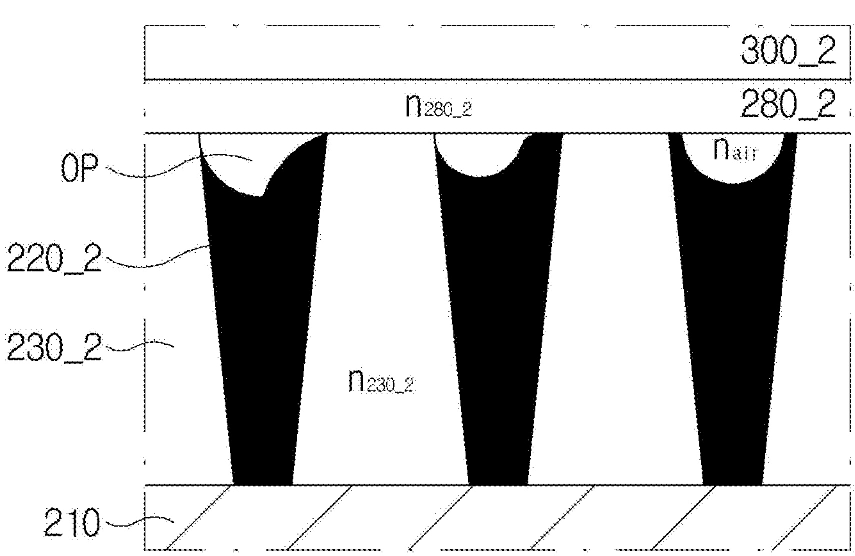
FIG. 7 is a diagram illustrating a light control film according to a comparative example of this specification.

FIG. 7 is a diagram illustrating a light control film according to a comparative example of this specification.

FIG. 7 is an enlarged view of a portion of the optical control film according to an embodiment of the specification.

FIG. 7 may help understand the reason and effect of placing the reinforcing layer 240 additionally as shown in FIG. according to the embodiments of this specification. During the process of scrubbing a louver layer 220_2 made of material such as black resin, the filling amount of the material, such as black resin, in the louver layer 220_2 may not be uniform due to surface tension. Therefore, the occurrence of uneven voids OP on the surface may result in diagonal stain defects. Uneven voids OP may be formed unevenly in the concave shape of the upper portion of the louver layer 220_2, as shown in FIG. 7, for example. When the reinforcing layer 240 of FIG. 5 according to the embodiments of this specification is not present, the uneven voids OP on top of each of the plurality of louver layers 220_2 may create an air gap, resulting in a medium with a refractive index of 1. The refractive index difference between the optical transmission layer 230_2 (e.g., refractive index $n_{230\_2}$=1.54), the voids OP as air bubbles (e.g., refractive index $n_{air}$=1), and the fixed member 280_2 (e.g., refractive index $n_{280\_2}$=1.48) may result in a refractive index deviation. Therefore, the refractive index deviation caused by voids OP may create diagonal stains, which may appear as an uneven surface on the display screen and degrade the quality of the display apparatus. The reinforcing layer 240 disposed on top of the concave upper portion of the louver layer 220_2 and the upper portion of the light-transmitting layer 230_2 may fill the voids OP, resulting in preventing or reducing the occurrence of diagonal stain defects. With reference to FIG. 7, the presence of voids OP due to the air gap may lead to deformation when attaching the light control film 200 and the cover member 300_2 with the bonding member 280 due to application of the attachment pressure and outgassing. In addition, when voids OP are present, cracks may occur due to contraction and expansion in high-temperature and high-humidity reliability environments. By adding the reinforcing layer 240 shown in FIG. 5 according to an embodiment of this specification, the voids OP may be filled, resulting in improvements such as the prevention of diagonal stains, prevention of deformation during module processing, and prevention of reliability cracks.

Figure 8:
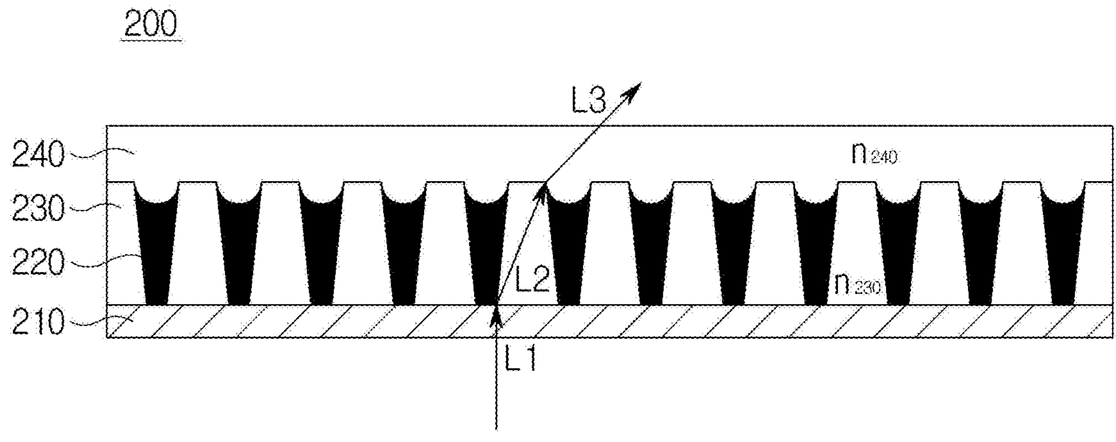
FIG. 8 is a diagram for explaining the refractive index of a light control film according to an embodiment of this specification.

FIG. 8 is a cross-sectional view for explaining the refractive index of the light control film according to an embodiment of the specification. FIG. 8 may help understand the reason and effect of placing the reinforcing layer 240 with a high refractive index additionally as shown in FIG. 5 according to the embodiments of this specification.

With reference to FIGS. 5 and 8, the light emitted from the display panel 100 may pass through the cover member 300, as denoted by L1. The light emitted from the display panel 100, as denoted by L1, may pass through the light-transmitting layer 230 with a refractive index $n_{230}$ (e.g., 1.54), as denoted by L2. For example, when viewing the navigation screen from the driver's seat, it may be necessary to increase the luminance from a viewing angle perspective. Therefore, the inventors of this specification attempted to increase the refractive index $n_{230}$ of the light-transmitting layer 230 but found a limit to the increase due to the phenomenon of delamination between the light-transmitting layer 230 and the base layer 210 in high-temperature and high-humidity reliability environments. In the case of adding the reinforcing layer 240 with a high refractive index $n_{240}$ according to an embodiment of this specification, the brightness at that viewing angle may be increased because the light passed through the light-transmitting layer, as denoted by L2, is further refracted to the side, as denoted by L3. The refractive index $n_{240}$ of the reinforcing layer 240 may be equal to or higher than 1.6, which is higher than the refractive index $n_{230}$ (e.g., 1.54) of the light-transmitting layer 230. The reinforcing layer 240 may include biphenylmethyl acrylate and polyethylene terephthalate (PET). The light-transmitting layer 230 may include phenoxy benzyl acrylate with a refractive index of 1.565 and o-phenylphenol EO acrylate with a refractive index of 1.577.

FIGS. 9 to 15 are diagrams for explaining a method of fabricating the light control film 200 according to an embodiment of this specification.

A description is made of the method of fabricating the light control film 200 for a display apparatus according to an embodiment is made hereinafter.

Figure 9:
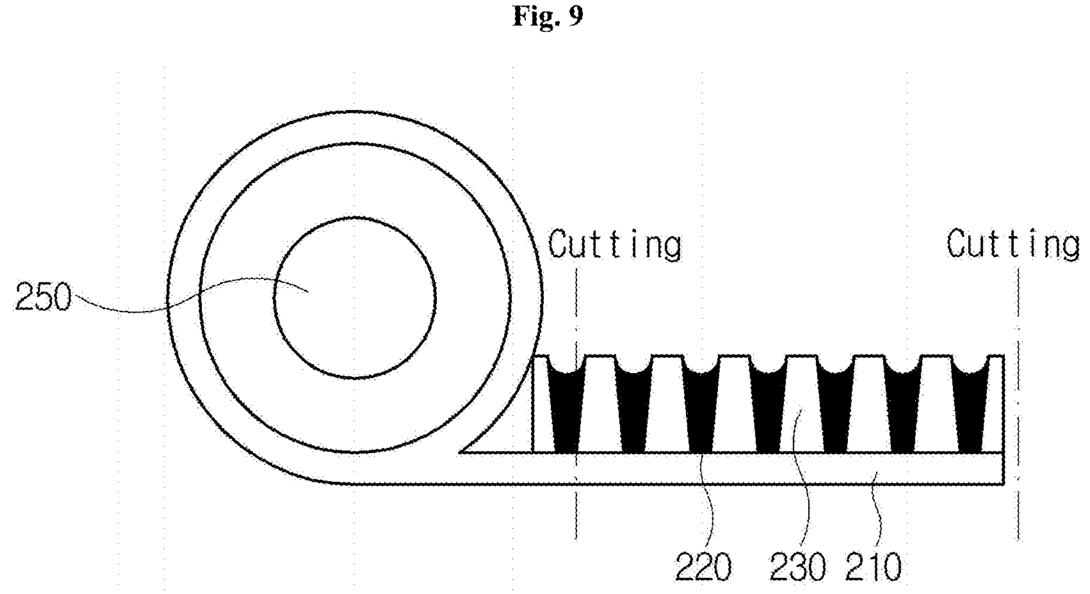
FIGS. 9 to 15 are diagrams illustrating a method of fabricating a light control film according to an embodiment of this specification.

With reference to FIG. 9, a light-transmitting layer 230 may be deposited on one surface of a base layer 210. The base layer 210 may include transparent organic material. For example, it may include at least one of organic materials such as acrylic resins, polyvinyl chloride (PVC), polyethylene terephthalate (PET), polymethyl acrylate, polyurethane, polycarbonate, polypropylene, and the like.

As an example, the light-transmitting layer 230 may be a polymer material (such as polyester-based or acrylic-based) having a transmittance of at least a predetermined amount (e.g., 80 percent or more).

The light-transmitting layer 230 may be formed by pouring and pressing resin into a mold to have grooves to be filled with a louver layer 220. The grooves to be filled with the louver layer 220 have a predetermined height and arrangement pitch, which are determined based on the angle at which light incident toward the cover member 300 is blocked from being emitted to the outside.

In order to facilitate the upward movement and separation of the mold after pressing the transparent resin to form the grooves, it is preferable for the grooves to have a trapezoidal shape, as shown in the drawing. This trapezoidal groove shape is easy to maintain even during the separation of the mold.

Next, the light-transmitting layer 230 formed with the grooves is cured. The curing process may be performed using methods such as ultraviolet curing, thermal curing, or other techniques suitable for the properties of the light-transmitting layer 230.

After curing the light-transmitting layer 230, the grooves may be filled with the louver layer 220 and cured to complete the base fabric of the light control film as shown in FIG. 9. The base fabric of the light control film, which is rolled up in the shape of a roll 250, may be unwound and cut to the desired size and specifications of the desired model.

Figure 10:
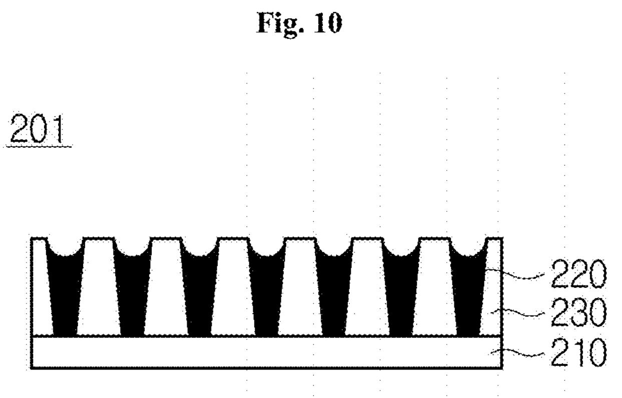

The base film 201 for the light control film may be completed as depicted in FIG. 10.

Figure 11:
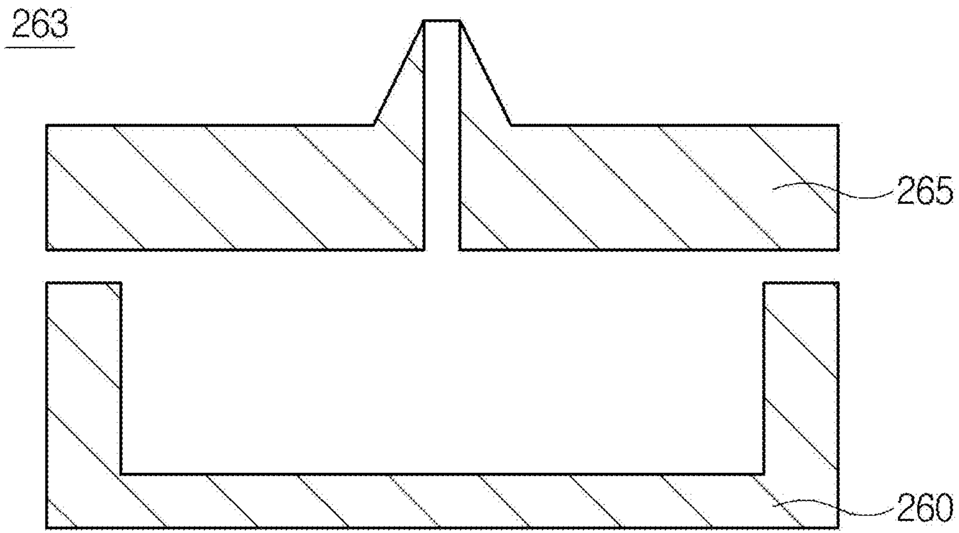

A mold 263 for adding a reinforcing layer 240 may be manufactured as shown in FIG. 11. The upper mold 265 may be a mold for injecting the reinforcing layer 240. The lower mold 260 may be a mold designed to fit the base film 201 of the light control film 200 according to the desired size and specifications of the model.

Figure 12:
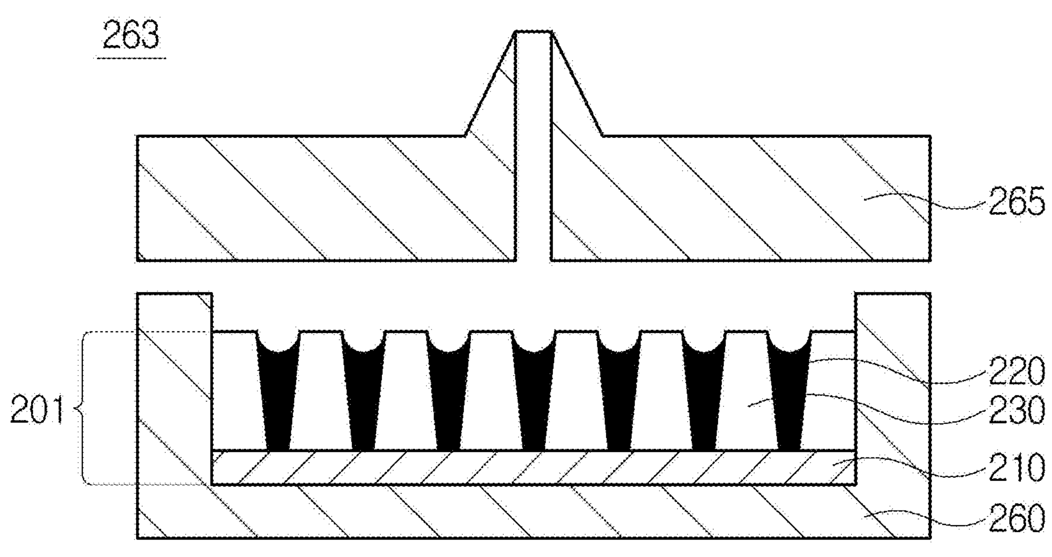

The base film 201 of the light control film may be mounted inside the lower mold 260 as shown in FIG. 12.

Figure 13:
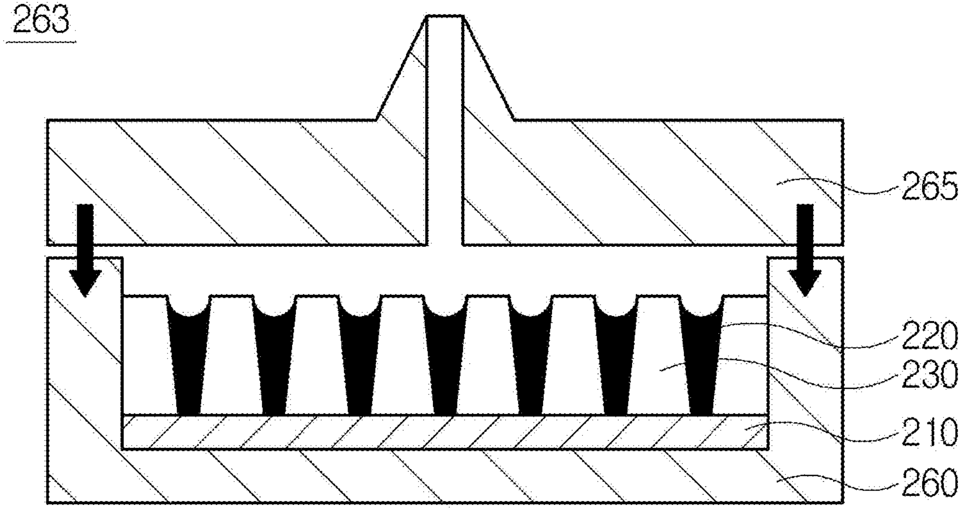

The upper mold 265 may be closed to fit the lower mold 260 as shown in FIG. 13. (Close)

Figure 14:
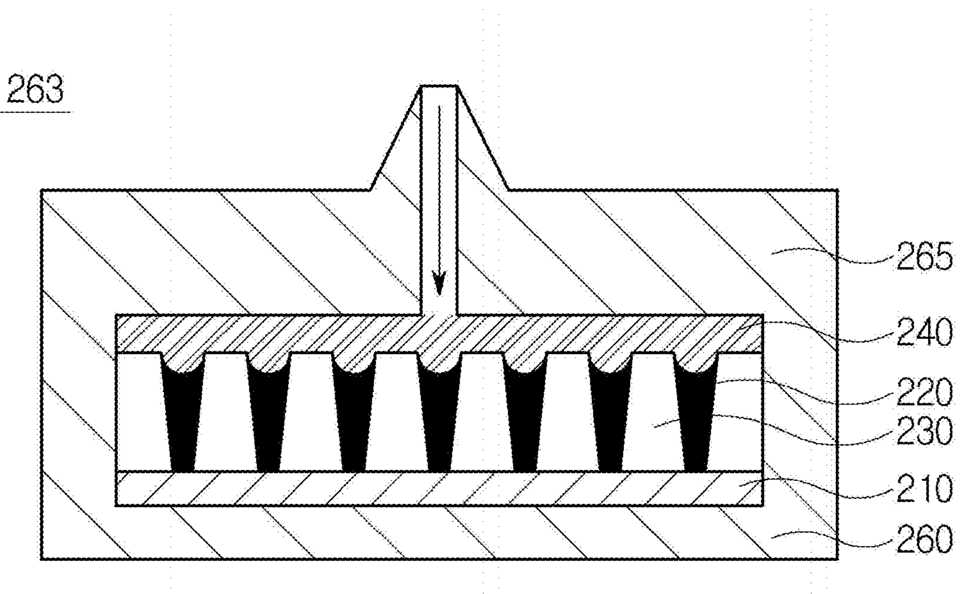

The reinforcing layer 240 may be injected into the mold 263 to be formed as shown in FIG. 14. The reinforcing layer 240 may be a resin. The reinforcing layer 240 may include biphenylmethyl acrylate and polyethylene terephthalate (PET).

Figure 15:
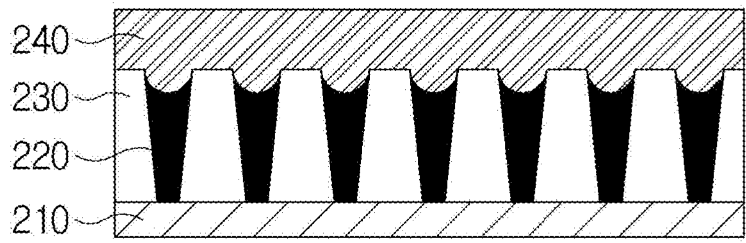

As shown in FIG. 15, the molded product of the light control film 200 may be extracted from the mold 263.

Although embodiments of this specification have been described in detail with reference to the accompanying drawings, it should be noted that the disclosure is not necessarily limited to these embodiments and can be modified in various ways without departing from the scope of the technical concept of the invention. Therefore, the embodiments disclosed in this specification are not intended to limit but to describe the technical idea of the present invention, and the scope of the technical idea of the present invention is not limited by the embodiments. The various features of the embodiments of the present invention can be combined or merged together, either partially or entirely, in a technically diverse manner, and each embodiment can be implemented independently or in conjunction with related embodiments. The scope of protection of technical ideas of the present invention shall be construed by the following claims, and all technical ideas within the scope equivalent thereto shall be construed as being within the scope of the rights of the present disclosure.

The display apparatus according to the embodiments of this specification may be applied to mobile devices, video phones, smartwatches, watch phones, wearable apparatuses, foldable apparatuses, rollable apparatuses, bendable apparatuses, flexible apparatuses, curved apparatuses, sliding apparatuses, variable apparatuses, electronic notebooks, e-books, portable multimedia players (PMPs), personal digital assistants (PDAs), MP3 players, mobile medical devices, desktop personal computers (PCs), laptop PCs, netbook computers, workstations, navigation devices, car navigation devices, car display apparatuses, car devices, theater devices, theater display apparatuses, televisions, wallpaper devices, signage devices, game devices, notebooks, monitors, cameras, camcorders, home appliances, etc. The display apparatus of this specification can also be applied to organic light-emitting illumination devices or inorganic light-emitting illumination devices.

A display apparatus according to an embodiment of this specification can be described as follows.

A display apparatus according to an embodiment of this specification may include a display panel having a display area and a non-display area. It may include a light control film on the display panel and a cover member on the light control film. The light control film may include a plurality of louver layers and a reinforcing layer on the plurality of louver layers.

According to some embodiments of this specification, the light control film may further include a light-transmitting layer disposed between the plurality of louver layers and adjacent ones of the plurality of louver layers, on a transparent base layer.

According to some embodiments of this specification, the plurality of louver layers may have a columnar shape of which the width varies in the direction from the bottom close to the display panel to the top close to the cover member.

According to some embodiments of this specification, the plurality of louver layers may include a black color material.

According to some embodiments of this specification, the reinforcing layer may fill the concave upper portions of the plurality of louver layers.

According to some embodiments of this specification, the refractive index of the reinforcing layer may be higher than that of the plurality of louver layers.

According to some embodiments of this specification, the refractive index of the reinforcing layer may be higher than that of the light-transmitting layer.

According to some embodiments of this specification, the cover member may include at least one shielding layer, which may have the same color as the louver layer.

According to some embodiments of this specification, the refractive index of the reinforcing layer may be equal to or higher than 1.6.

According to some embodiments of this specification, the reinforcing layer may include at least one of biphenylmethyl acrylate and polyethylene terephthalate.

According to an embodiment of this specification, a display apparatus may include a display panel including a display area and a non-display area, a light control film on the display panel, and a cover member on the light control film. According to an embodiment of this specification, the light control film of the display apparatus includes a louver layer, and the cover member includes at least one shielding layer, and the louver layer and the shielding layer may have the same color.

According to some embodiments of this specification, the light control film may include a plurality of louver layers and a reinforcing layer on top of the plurality of louver layers.

According to some embodiments of this specification, the light control film may further include a transparent base layer disposed below the plurality of louver layers and a transparent light-transmitting layer disposed on the side of multiple louver layers.

According to some embodiments of this specification, the plurality of louver layers may have a columnar shape of which the width varies in the direction from the bottom close to the display panel to the top close to the cover member.

According to some embodiments of this specification, the display panel may include a plurality of transistors, an encapsulation portion, and a touch portion.

According to some embodiments of this specification, the reinforcing layer may fill the concave upper portions of the plurality of louver layers.

According to some embodiments of this specification, the refractive index of the reinforcing layer may be greater than that of the plurality of louver layers.

According to some embodiments of this specification, the refractive index of the reinforcing layer may be higher than that of the light-transmitting layer.

According to some embodiments of this specification, the refractive index of the reinforcing layer may be equal to or higher than 1.6.

According to some embodiments of this specification, the reinforcing layer may include at least one of biphenylmethyl acrylate and polyethylene terephthalate.

It will be apparent to those skilled in the art that various modifications and variations can be made in the display apparatus of the present disclosure without departing from the technical idea or scope of the disclosure. Thus, it is intended that the present disclosure cover the modifications and variations of this disclosure provided they come within the scope of the appended claims and their equivalents.

DESCRIPTION OF REFERENCE NUMERALS

100: display panel
210: base layer
220: louver layer
230: light-transmitting layer
240: reinforcing layer
200: light control film
290: shielding layer
300: cover member

What is claimed is:

1. A display apparatus including a display area and a non-display area, comprising:
- a display panel;
- a light control film on the display panel; and
- a cover member on the light control film, wherein the light control film comprises a plurality of louver layers and a reinforcing layer on the plurality of the louver layers,
  - wherein the plurality of louver layers have a columnar shape of which a width increases in a direction from a bottom of the columnar shape closer to the display panel to a top of the columnar shape closer to the cover member,
- wherein each of the plurality of louver layers has a concave upper portion, and
- wherein the reinforcing layer fills the concave upper portions of the plurality of louver layers.

2. The display apparatus of claim 1, wherein the light control film further comprises:
- a base layer on which the plurality of louver layers are disposed; and
- a light-transmitting layer disposed between the plurality of louver layers adjacent to each other.

3. The display apparatus of claim 2, wherein the plurality of louver layers are filled with a black resin such that an outer surface of the plurality of the louver layers includes the black resin in direct contact with the light-transmitting layer.

4. The display apparatus of claim 1, wherein the plurality of louver layers include a black color material.

5. The display apparatus of claim 1, wherein the reinforcing layer fills a concave upper portion of the plurality of louver layers.

6. The display apparatus of claim 1, wherein the reinforcing layer has a refractive index higher than that of the plurality of louver layers.

7. The display apparatus of claim 1, wherein a refractive index of the reinforcing layer is higher than that of a light-transmitting layer included in the light control film.

8. The display apparatus of claim 1, wherein the cover member further comprises at least one shielding layer,
- wherein the at least one shielding layer has a same color as the plurality of louver layers.

9. The display apparatus of claim 1, wherein the reinforcing layer has a refractive index equal to or higher than 1.6.

10. The display apparatus of claim 1, wherein the reinforcing layer comprises at least one of biphenylmethyl acrylate and polyethylene terephthalate.

11. A display apparatus including a display area and a non-display area, comprising:
- a display panel;
- a light control film on the display panel; and
- a cover member on the light control film,
- wherein the light control film comprises a louver layer, the cover member comprises at least one shielding layer, and the louver layer and the shielding layer have a same color,
  - wherein the louver layer includes a plurality of louver layers each having a columnar shape of which a width increases in a direction from a bottom of the columnar shape closer to the display panel to a top of the columnar shape closer to the cover member, wherein each of the plurality of louver layers has a concave upper portion, and wherein the light control film further comprises a reinforcing layer on the plurality of louver layers that fills the concave upper portions of the plurality of louver layers.

12. The display apparatus of claim 11, wherein the light control film further comprises a reinforcing layer on the plurality of louver layers.

13. The display apparatus of claim 12, wherein the reinforcing layer fills a concave upper portion of the plurality of louver layers.

14. The display apparatus of claim 12, wherein the reinforcing layer has a refractive index higher than that of the plurality of louver layers.

15. The display apparatus of claim 12, wherein a refractive index of the reinforcing layer is higher than that of a light-transmitting layer included in the light control film.

16. The display apparatus of claim 12, wherein the reinforcing layer has a refractive index equal to or higher than 1.6.

17. The display apparatus of claim 12, wherein the reinforcing layer comprises at least one of biphenylmethyl acrylate and polyethylene terephthalate.

18. The display apparatus of claim 11, wherein the light control film further comprises:

a base layer transparent and disposed below the louver layer; and a light-transmitting layer that is transparent and disposed on sides of the louver layer.

19. The display apparatus of claim 18, wherein the plurality of louver layers are filled with a black resin such that an outer surface of the plurality of the louver layers includes the black resin in direct contact with the light-transmitting layer.

20. The display apparatus of claim 11, wherein the display panel comprises a plurality of transistors, an encapsulation portion, and a touch portion.

* * * * *